May 17, 1938.   G. D. LITTLEFIELD   2,117,617
SAFETY ATTACHMENT FOR AUTOMOBILES
Filed Aug. 18, 1937
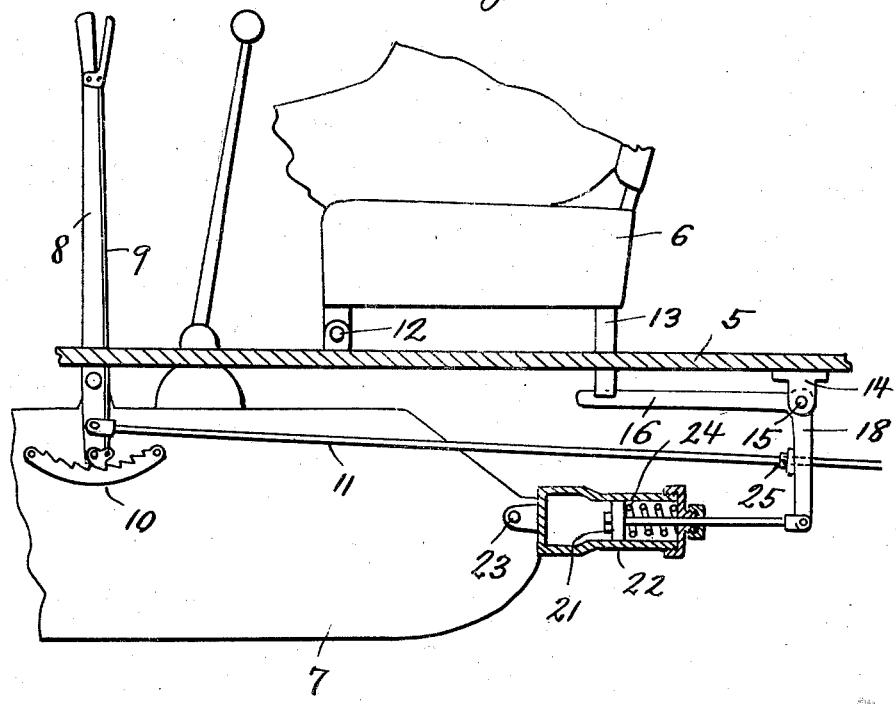
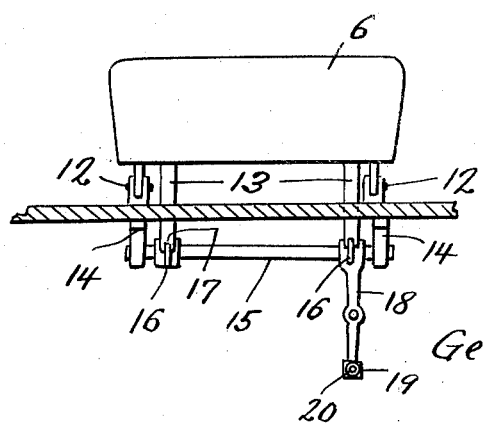
Inventor
George D. Littlefield
By Clarence A. O'Brien
Hyman Berman
Attorneys Patented May 17, 1938

2,117,617

UNITED STATES PATENT OFFICE 2,117,617

SAFETY ATTACHMENT FOR AUTOMOBILES

George D. Littlefield, Searsport, Maine

Application August 18, 1937, Serial No. 159,776

3 Claims. (Cl. 188—109)

This invention relates to automobiles and more particularly to brake-operating mechanisms therefor.

An object of the invention is to provide means for use in conjunction with the hand brake control of an automobile whereby under certain conditions the brakes of the automobile may be automatically or, in other words, without requiring the attention of the operator, applied; and whereby also when applied an accidental release of the brakes is precluded.

The invention together with its objects and advantages will be best understood from a study of the following description taken in connection with the accompanying drawing wherein:—

Figure 1 is an elevational view illustrating the application of the invention, with certain parts shown in section, and with the brakes in a released condition.

Figure 2 is a fragmentary detail view illustrating certain details hereinafter more fully referred to.

Referring to the drawing by reference numerals it will be seen that 5 indicates the floor board of an automobile; 6 the driver's seat of the automobile; 7 the transmission casing; 8 the emergency or hand brake lever; 9 the detent with which the lever 8 is usually equipped; and 10 the rack segment with which the detent 9 is cooperable for securing the lever 8 at the desired brake applying and/or brake release position; while the brake rod is indicated by the reference numeral 11.

The operator's seat 6 at its forward edge is pivoted in a conventional manner as at 12, while at the rear thereof seat 6 is provided with a pair of depending legs 13 that, in accordance with the present invention, work through suitable openings provided therefor in the floor board 5.

Mounted on the floor board 5 at the under side thereof are a pair of laterally spaced brackets 14. Journaled in the brackets 14 are the ends of a shaft 15. Shaft 15 has extending therefrom a pair of arms 16; there being one arm 16 for each leg 13, and each leg 13 at the lower end thereof is provided with a notch 17 in which the free end of an arm 16 is engaged as clearly shown in Figure 2.

Shaft 15 is also provided with a crank arm 18 which at one end is pivoted as at 19 to a piston rod 20.

Rod 20 is connected with a piston 21 that works in a cylinder 22. Cylinder 22 at one end is pivoted as at 23 to, as shown in the drawing, the transmission case 7 although it will be understood that said cylinder may be pivoted to the frame or any other suitable and fixed part of the automobile.

Housed within the cylinder 22 is a coil spring 24 one end of which bears on the piston 21 normally urging the piston towards the left in Figure 1 thus tending to rock the shaft 15 in a clockwise direction to support the rear end of the seat 6 in what may be considered an elevated position.

Crank arm 18 is provided intermediate its ends with an opening to accommodate a brake rod 11 and adjustably secured on the brake rod 11 at one side of the arm 18 is a stop 25.

As clearly shown in Figure 2 at the pivoted end thereof cylinder 22 is diametrically enlarged. Cylinder 22 is adapted to contain oil which normally seeks its level in the enlarged end of the cylinder 22 and acts on the piston in opposition to the spring 24 for yieldably holding the piston 21 in its normal position which is substantially the position shown in Figure 1.

The operation, utility and advantages of the invention will be apparent from the following:

In Figure 1 seat 6 is shown as being occupied and the hand lever 8 is in brake release position. It will thus be seen that when the weight of the occupant is removed from the seat 6 spring 24 will act on piston 21 to urge the same into the enlarged end of the cylinder 22. This will result in a clockwise rotation of shaft 15 and the raising of arms 16 so that, arm 18 swinging with the shaft in said clockwise direction engages the stop 25 for urging the brake rod 11 towards the left in Figure 1 thus resulting in a substantially automatic application of the wheel brakes of the automobile. Thus in this manner, it will be appreciated, application of the wheel brakes is made without requiring the direct attention of the operator. However, the device, as is also thought to be apparent from a study of Figure 1, will in no wise interfere with the manual application of the brakes by the operator, which manual application is, of course, accomplished by the operator pulling back on the hand lever 8.

When the occupant again resumes his position on seat 6 the rear end of the seat will be depressed thus causing shaft 15 to rock in a counter-clockwise direction causing arm 18 to swing in a corresponding direction with the result that piston 21 will move towards the right in Figure 2 into the reduced end of the cylinder against the action of spring 24. Consequently arm 18 will be moved out of engagement with the stop 25 so that the brakes may be released by the operator in the usual manner, namely by pushing forwardly on the lever 8 whereupon the parts will resume the position shown in Figure 1 in which position stop 25 will be either in contact with arm 18 or in close proximity thereto.

It will also be appreciated from the above that with the brakes applied and seat 6 unoccupied there is little possibility of the wheel brakes being accidentally released since arm 18 engaging stop 25 will tend to hold the brake rod 11 in the forward or brake applying position and will continue to do so until someone occupies the seat 6.

It is thought that a clear understanding of the invention will be had from the above without a more detailed description; and in this connection it will be noted that through the medium of the cylinder 22 and piston 21 application of the brakes is retarded to such an extent that there will not be an immediate application of the brakes due to a slight shifting of the weight of the occupant of the seat, as is the difficulty with similar devices of this character now known or patented. In this connection it will be further noted, in regard to the foregoing, that the application of the brakes does not take place until the piston approaches the enlarged end of the cylinder when the movement of the piston will be accelerated under the pressure of spring 24. Consequently upon the weight of the occupant being relieved from the seat, application of the brakes will not take place immediately but a suitable period of time will intervene before such brake application. Thus one may temporarily and for a short period of time remove himself from the seat without the brakes being applied.

Having thus described the invention what is claimed as new is:—

1. In an automobile, and in combination, an emergency brake lever, an operator's seat pivoted at its forward end and having at its rear end depending legs working through openings in the floor of the automobile body, a shaft rotatably supported beneath the flooring, means for supporting said shaft, said shaft having a pair of arms extending therefrom and said legs having lower ends engaging the free ends of said arms, a crank arm extending from said shaft, a brake rod connected at one end with said brake lever and working through an opening in said crank arm, a stop on said brake rod in the path of said crank arm, a device pivoted at one end on the automobile and at a relatively opposite end pivotally connected with said crank arm and normally urging said shaft to rock in one direction for releasably supporting the rear of the said seat in an elevated position, resilient means adapted to actuate said crank arm to its brake applying position when said seat is unoccupied and pneumatic means operable to retard brake applying movement of said resilient means.

2. In an automobile, and in combination, a brake lever, a brake rod connected at one end with said lever, a seat for the operator of the automobile, means operatively connected with said seat and said brake rod for shifting the brake rod to a brake applying position incidental to the relieving of the seat of the weight of an occupant and for holding the brake rod in the brake applying position as long as said seat remains unoccupied and means for retarding brake applying movement of said first named means.

3. In an automobile, and in combination, a brake lever, a brake rod connected at one end to said lever, a seat pivoted at one end in the automobile, supporting means operatively connected to the rear end of the seat, resilient means for said supporting means, an operating connection between said supporting means and said brake rod, said resilient means being adapted to actuate said connection into a brake applying position upon a raising movement of the seat and being further adapted to release the rod upon a downward movement of the seat and pneumatic means for retarding brake applying movement of said resilient means.

GEORGE D. LITTLEFIELD.